Patented Mar. 4, 1947

2,416,668

UNITED STATES PATENT OFFICE 2,416,668

PROCESS OF IMPROVING COMPOUNDING CHARACTERISTICS OF BUTADIENE-1,3 COPOLYMERS BY MEANS OF N-HALOGEN AMIDES

Herman Elbert Schroeder, Wilmington, Del., assignor to E. I. du Pont de Nemours & Company, Wilmington, Del., a corporation of Delaware No Drawing. Application June 5, 1944, Serial No. 538,876

11 Claims. (Cl. 260—36)

This invention relates to a method of improving the processing characteristics, that is, the ease of mastication and of compounding operations, of rubbery diene polymers and copolymers.

It is well known in the rubber manufacturing art that the usefulness of any rubber-like material depends in part upon the ease with which this material may be worked or milled so that fillers and curing ingredients can be rapidly and successfully incorporated and dispersed therein. A number of compounds, for example thiols and substituted hydrazines have been used as processing aids for improving the working and milling characteristics of natural rubber. These compounds are only moderately effective for this purpose with synthetic rubber and they have certain disadvantages, for example disagreeable odor in the thiols and toxicity in the hydrazines.

An object of this invention is to provide a method of improving the working and milling characteristics of rubbery hydrocarbon polymers, including copolymers, of conjugated diene hydrocarbons so that processing operations prior to vulcanization are materially facilitated. A further object is to provide a class of compounds which increase the ease of milling of rubbery hydrocarbon polymers of conjugated dienes when added in small amounts. Further objects will appear hereinafter.

These objects are accomplished in accordance with the present invention by milling, i. e. doing internal work upon, an unvulcanized, rubbery hydrocarbon polymer of a conjugated diene mixed with a small amount of an N-halogen amide in which the halogen is chlorine, bromine, or iodine but preferably chlorine or bromine. The addition of as little as 0.1% and preferably 0.25% to 5% of an N-halogen amide to the rubbery hydrocarbon polymer of the conjugated diene during milling reduces, by as much as 85%, the time necessary for break down to a smooth, continuous sheet which is capable of readily taking up compounding ingredients.

In the preferred process of this invention a small amount of an N-chloroamide is added to a rubbery hydrocarbon polymer of a conjugated diene on a rubber mill or in an internal mixer and mastication is continued until the rubbery polymer or copolymer becomes soft and plastic. If the process is carried out on a rubber mill, the material in a short time forms a continuous, rolling sheet free from holes. The time required for the rubbery polymer or copolymer to reach the state at which compounding ingredients are readily dispersed therein is markedly less than if milling is continued without the addition of the N-chloroamide.

The more detailed practice of this invention is illustrated by the following examples in which parts are given by weight.

Example I

Twenty (20) parts of a synthetic, rubber-like copolymer prepared from a mixture of 75 parts of 1,3-butadiene and 25 parts of styrene, known commercially at GR-S, is placed on a six inch rubber mill heated to 70° C. and the mill is set so that the opening between the rolls is 18 gauge. Then 0.8 part (4%) of 1,3-dichloro-5-methyl-5-isobutylhydantoin is added to the rubbery material and milling is continued. After milling for fifteen minutes, the synthetic rubber forms a smooth, continuous sheet that grips the mill roll firmly, contains no holes and can readily be compounded. Another 20 parts of this same batch of GR-S is milled under exactly the same conditions, but ninety minutes' milling is required before the rubbery material is broken down to a continuous sheet free from holes and readily compounded. Thus, the presence of the 1,3-dichloro-5-methyl-5-isobutylhydantoin effects a 77% reduction in milling time required to reach the desired state for satisfactory compounding.

Example II

As described in Example I, GR-S is milled with 4% of the following chlorohydantoins as milling aids, in which case 48% to 80% reduction in milling time is obtained over the time required to reach the same state when no milling aid is added.

| Compound | Per cent reduction in milling time |
|---|---|
| N-chloro-5-methyl-5-isobutylhydantoin | 48 |
| Methylene-bis-(N-chloro-5-methyl-5-isobutylhydantoin) | 52 |
| N-chloro-5,5-dimethylhydantoin | 56 |
| N-chloro-5-methyl-5-ethylhydantoin | 65 |
| 1,3-dichloro-5,5-dimethylhydantoin | 56 |
| 1,3-dichloro-5-methyl-5-ethylhydantoin | 80 |
| M-chloro-5,5-pentamethylenehydantoin | 49 |

Example III

GR-S is milled with 4% of N-chlorophthalimide in the manner described in Example I. A reduction in milling time of 81% is obtained.

Example IV

As described in Example I, GR-S is milled with 4% of the following chlorinated sulfonamides and substantial reductions in milling time are obtained in every case.

| Compound | Per cent reduction in milling time |
|---|---|
| N,N-dichloro-p-toluenesulfonamide | 47 |
| N,N-dichloro-p-carboxybenzenesulfonamide | 61 |
| Zinc salt of N,N-dichloro-p-carboxybenzenesulfonamide | 61 |
| Butane-1,4-bis(sulfondichloroamide) | 60 |
| Propane-1,3-bis(N,N-dichlorosulfonamide) | 75 |
| N,N,N',N'-tetrachlorocyclohexanedisulfonamide-1,4 | 78 |

This invention is generic to the milling of, i. e. the doing of internal work upon, a rubbery hydrocarbon polymer of an acyclic conjugated diene hydrocarbon mixed with an N-halogen amide having the group

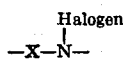

wherein X is CO or SO₂, and the halogen is chlorine, bromine, or iodine but preferably chlorine or bromine. Included in this case are the N-chlorocarbonamides, e. g. N-chloroacetamide, N-chlorohexanamide, N-chlorododecanamide, N-chlorooctadecanamide; the N-chlorohydantoins of the formula:

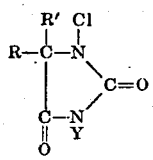

wherein R and R' are hydrogen or hydrocarbon and Y is hydrogen chlorine, bromine, or iodine. Compounds of this type are illustrated in Examples I and II. Additional illustrative compounds are:

N-chloro-5-methyl-5-amylhydantoin,
1,3-dichloro-5-methyl-5-amylhydantoin,
N-chloro-5-methyl-5-phenylhydantoin,
N-chloro-5-n-butylhydantoin,
N-chloro-5-ethyl-5-phenylhydantoin, and
N-chloro-5-methyl-5-cyclohexylhydantoin.

Other halogen compounds which may be used include

N-bromoacetamide,
N-bromooctadecanamide,
N-bromo-5,5-dimethylhydantoin,
1,3-dibromo-5-methyl-5-isobutylhydantoin,
N-iodoacetamide, and
N-iodopropionamide.

Also included in this class are the N-chlorosulfonamides as illustrated in Example IV. Additional N-chlorosulfonamides are N,N-dichloro-n-butanesulfonamide-1, N,N-dichlorobenzenesulfonamide, N,N-dichloromethanesulfonamide, and N-chloropropanesulfonamide-1. Other compounds useful in this invention are the N-chloroimides, illustrated by Example III.

The unvulcanized rubbery hydrocarbon polymers of conjugated dienes, the milling characteristics of which are improved by the process of this invention include natural rubber and synthetic isoprene polymers, 1,3-butadiene polymers, and copolymers containing major amounts of 1,3-butadiene or isoprene and minor amounts of styrene, alpha-methyl-styrene, vinylnaphthalene, etc. Of these, the synthetic rubbery hydrocarbon polymers containing a major proportion of the hydrocarbon diene constituents such as 75:25 butadiene/styrene (GR-S) copolymers are preferred since improvements in milling characteristics are most marked with these elastomers when treated in accordance with the process of this invention. The process of the invention is also applicable to copolymers of conjugated diene hydrocarbons containing major amounts of 1,3-butadiene or isoprene and minor amounts of non-hydrocarbon vinyl or vinylidene compounds, for example acylonitrile, methyl methacrylate, dimethyl-(vinylethinyl)carbinol, methyl beta-vinylacrylate, vinylidene chloride, methyl vinyl ketone and vinylpyridine, but the results with these polymers containing elements other than carbon and hydrogen are by no means as satisfactory as are the results with hydrocarbon polymers.

The processing aids of this invention may be used at temperatures between 25° C. and 150° C. The N-chloroamide may be added to the rubbery hydrocarbon polymer as a powder, or it may first be dissolved in a suitable solvent, for example esters, e. g. ethyl acetate, triacetin, butyl sebacate; ethers, e. g. ethylene glycol monomethyl ether, ethylene glycol dimethyl ether, diethylene glycol monomethyl ether, dioxane; alcohols, e. g. isopropyl alcohol; chlorinated hydrocarbons, e. g. chloroform. The improvement in milling and working properties of the rubbery hydrocarbon polymers through the addition of the N-chloramides is particularly evident when these compounds are incorporated in the diene polymer on a rubber mill. Improved working properties are also obtained however when the diene polymers or copolymers are mixed with the chloramides by other means, for example in an internal mixer.

Small amounts, for example from 0.25% to 5% of the N-chloramides by weight, based on the weight of the diene polymer or copolymer used, are sufficient to reduce the time necessary for milling of the polymeric materials to obtain the physical state where they may be readily compounded with compounding ingredients, for example fillers and curing agents. On a rubber mill, this point is reached when the rubbery polymeric material forms a smooth, continuous sheet free from holes, soft, and with good tack. Larger amounts of the N-chloramides can be used, but these do not usually offer any advantages over the use of smaller amounts. An outstanding advantage of the use of the N-chloramides used in connection with the rubbery diene polymers and copolymers is that they reduce the time required for the fabrication of useful articles from these polymers, the total power requirements in milling, and allow greater production of finished goods per unit of equipment. Furthermore, only small amounts are necessary so that while the ease of milling of the rubbery polymer is greatly improved, the properties of the final vulcanizates are not materially affected by the addition of these compounds.

Although this invention has been described primarily in terms of the N-chloroamides, other halogen derivatives, for example the bromine and iodine derivatives are also effective. The bromine and chlorine derivatives are preferred.

The above description and examples are intended to be illustrative. Any modification of or variation therefrom which conforms to the spirit of the invention is intended to be included within the scope of the claims.

What is claimed is:

1. Process for bringing a hydrocarbon polymer of butadiene-1,3 into condition for the incorporation of compounding agents which comprises masticating a mixture of said polymer and a small amount, of the order of 0.25 to 5%, based on the weight of the polymer, of an N-halogen amide wherein the halogen is selected from the class consisting of chlorine, bromine, and iodine.

2. Process for bringing a butadiene/styrene copolymer having a major proportion of butadiene-1,3 into condition for the incorporation of compounding ingredients which comprises masticating a mixture of said polymer and a small amount, of the order of 0.25% to 5.0%, based on the weight of the polymer, of an N-bromoamide.

3. Process for bringing a hydrocarbon polymer of butadiene-1,3 into condition for the incorporation of compounding agents which comprises masticating a mixture of said polymer and a small amount, of the order of 0.25 to 5%, based on the weight of the polymer, of an N-chloroamide.

4. Process for bringing a hydrocarbon polymer of butadiene-1,3 into condition for the incorporation of compounding agents which comprises milling a mixture of said polymer and a small amount, of the order of 0.25 to 5%, based on the weight of the polymer, of an N-halogen amide wherein the halogen is selected from the class consisting of chlorine, bromine, and iodine on a rubber mill until the milling sheet is continuous, free from holes, soft, and tacky.

5. Process for bringing a hydrocarbon polymer of butadiene-1,3 into condition for the incorporation of compounding agents which comprises milling a mixture of said polymer and a small amount, of the order of 0.25% to 5.0%, based on the weight of the polymer, of an N-bromoamide.

6. Process for bringing a hydrocarbon polymer of butadiene-1,3 into condition for the incorporation of compounding agents which comprises milling a mixture of said polymer and a small amount, of the order of 0.25 to 5%, based on the weight of the polymer, of an N-chloroamide on a rubber mill until the milling sheet is continuous, free from holes, soft, and tacky.

7. Process for bringing a butadiene/styrene copolymer having a major proportion of butadiene-1,3 into condition for the incorporation of compounding ingredients which comprises masticating a mixture of said polymer and a small amount, of the order of 0.25 to 5%, based on the weight of the polymer, of an N-halogen amide wherein the halogen is selected from the class consisting of chlorine, bromine, and iodine.

8. Process for bringing a butadiene/styrene copolymer having a major proportion of butadiene-1,3 into condition for the incorporation of compounding agents which comprises masticating a mixture of said copolymer and a small amount, of the order of 0.25% to 5%, based on the weight of the copolymer, of an N-chloroamide.

9. Process for bringing a butadiene/styrene copolymer having a major proportion of butadiene-1,3 into condition for the incorporation of compounding agents which comprises masticating a mixture of said copolymer and a small amount, of the order of 0.25% to 5%, based on the weight of the copolymer, of an N-chlorohydantoin.

10. Process for bringing a butadiene/styrene copolymer having a major proportion of butadiene-1,3 into condition for the incorporation of compounding agents which comprises masticating a mixture of said copolymer and a small amount, of the order of 0.25% to 5%, based on the weight of the copolymer, of an N-chloro-5,5-dialkylhydantoin.

11. Process for bringing a butadiene/styrene copolymer having a major proportion of butadiene-1,3 into condition for the incorporation of compounding agents which comprises masticating a mixture of said copolymer and a small amount, of the order of 0.25% to 5%, based on the weight of the copolymer, of a 1,3-dichloro-5,5-dialkylhydantoin.

HERMAN ELBERT SCHROEDER.

REFERENCES CITED

The following references are of record in the file of this patent:

UNITED STATES PATENTS

| Number | Name | Date |
|---|---|---|
| 2,325,947 | Garvey | Aug. 3, 1943 |